US005633661A

United States Patent [19]

Morse

[11] Patent Number: 5,633,661

[45] Date of Patent: May 27, 1997

[54] VIDEO DISPLAY CONTROL SYSTEM HAVING BLOCK WRITE WITH OPAQUE PATTERN CONTROL EXPANSION

[75] Inventor: Gary J. Morse, Boca Raton, Fla.

[73] Assignee: International Business Machines Corporation, Armonk, N.Y.

[21] Appl. No.: 342,531

[22] Filed: Nov. 21, 1994

[51] Int. Cl.[6] .................................................. G06F 12/00

[52] U.S. Cl. ............................................ 345/186; 395/509

[58] Field of Search .................................. 345/186, 185, 345/199, 191; 395/509

[56] References Cited

U.S. PATENT DOCUMENTS

| | | | |
|---|---|---|---|
| 4,804,948 | 2/1989 | Nishi et al. . | |
| 4,857,899 | 8/1989 | Ishii . | |
| 4,905,167 | 2/1990 | Yamoaka et al. . | |
| 4,920,483 | 4/1990 | Pogue et al. . | |
| 5,229,971 | 7/1993 | Kiryu et al. . | |
| 5,233,690 | 8/1993 | Sherlock et al. . | |
| 5,251,298 | 10/1993 | Nally . | |
| 5,261,049 | 11/1993 | Lumelsky et al. | 345/191 X |
| 5,430,464 | 7/1995 | Lumelsky | 345/186 X |
| 5,533,187 | 7/1996 | Preim et al. | 395/509 X |

*Primary Examiner*—Mark R. Powell

*Attorney, Agent, or Firm*—Felsman, Bradley, Gunter & Dillon

[57] ABSTRACT

A video random access memory is disclosed that performs a block write function for an opaque pattern color expansion. The video RAM, or VRAM, uses an input buffer for receiving and holding video input information. A first color register is coupled to the input buffer and holds a first color value. A second color register coupled to the input buffer is used to hold a second color value. A gate multiplexor couples to both first color register and the second color register with a color selection register being used to gate which color value from the first color register or the second color register should be asserted. A write control logic selects which color values are to be displayed. A third or mask register is coupled to the input buffer and the write control logic such that, based upon data from the input buffer, the mask register selects which pixel location is to be changed based on the color value selected by the color selection register as received from the write control logic.

12 Claims, 1 Drawing Sheet

VIDEO DISPLAY CONTROL SYSTEM HAVING BLOCK WRITE WITH OPAQUE PATTERN CONTROL EXPANSION

BACKGROUND OF THE INVENTION

1. Technical Field

The present invention relates generally to video controllers for data processing systems and, more specifically, to graphics coprocessors or video accelerators in a data processing system using a VRAM block write operation. Still more particularly, the present invention relates to a VRAM used in support in a video display control system for providing opaque pattern block write color expansion.

2. Description of the Related Ad:

The performance of graphics subsystems is currently limited by the ability to get the pixel information from the graphics coprocessor or accelerator to the VRAM buffer. Current memory technology using DRAM interfaces is limited to writing and reading data at about 40 nsec per transfer. The typical data width used by today's PC graphics subsystems is a 32 bit data bus. With DRAM interfaces running at 40 nsec/transfer for eight (8) bits per pixel, this corresponds to 100M Pixels per second (MP/SEC).

Currently, VRAM are capable of doing "Block Writes" which is the ability to copy the value in a color register to eight (8) pixel column locations on a single write. This capability allows for up to 32 pixels to be written in one cycle for a 32-bit data path, instead of the usual four (4) pixels. The pixel rate is then equal to 800 MP/Sec, instead of 100 MP/Sec.

In addition to writing the color register value to the eight (8) pixels, VRAM also uses an 8-bit mask register to determine whether or not it should write a particular pixel. The combination of the mask register and the color register allows the graphics engine to write transparent patterns. A transparent pattern is the result of updating the pixels that correspond to a "1" in the mask register and leaving the pixels that correspond to a "0" in the mask register to stay unchanged.

As long as transparent patterns are required, the pixel throughput is still 800 MP/Sec. Typically, however, text and pattern data is not transparent, but instead are opaque. Writing opaque patterns or fonts in this manner requires two (2) passes, so performance degrades to 400 MP/Sec and coprocessor complexity increases. Unfortunately, VRAM devices currently available lack a opaque pattern block write function. Accordingly, what is needed is a video processing system having a VRAM that supports the block write function for opaque pattern color expansion.

SUMMARY OF THE INVENTION

It is therefore one object of the present invention to provide video controllers for data processing systems.

It is another object of the present invention to provide video controllers for data processing systems with graphics coprocessors or video accelerators using a VRAM block write operation.

It is yet another object of the present invention to provide a VRAM used in support in a video display control system for providing opaque pattern block write color expansion.

The foregoing objects are achieved as is now described. According to the present invention, a video random access memory is disclosed that performs a block write function for an opaque pattern color expansion. The video RAM, or VRAM, uses an input buffer for receiving and holding video input information. A first color register is coupled to the input buffer and holds a first color value. A second color register coupled to the input buffer is used to hold a second color value. A gate multiplexor couples to both first color register and the second color register with a color selection register being used to gate which color value from the first color register or the second color register should be asserted. A write control logic selects which color values are to be displayed. A third or mask register is coupled to the input buffer and the write control logic such that, based upon data from the input buffer, the mask register selects which pixel location is to be changed based on the color value selected by the color selection register as received from the write control logic.

The three registers used in the VRAM may be either 8-bit registers or 32-bit registers. Additionally, a second multiplexor is coupled to the gate multiplexor, the input buffer, and the write control logic and is used to gate data either from the first or second control register or from the input buffer to the write control logic. The first color register is used to provide the foreground color data for the display while the second color register is used to provide the background color data for display. The VRAM may also be used in a video display system further comprising a central processing unit, random access memory, a video processor, and a video display unit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Current VRAMs provide transparent pattern block write functions. The VRAMs have only one color register and no color select register since the block write functions do not need such registers. The video display processing system depicted in the block diagram of FIG. 1, however, has a VRAM that performs the block write function of opaque pattern color expansion. To perform opaque pattern color write expansion, a second color register and a color select register are added.

Figure 1:
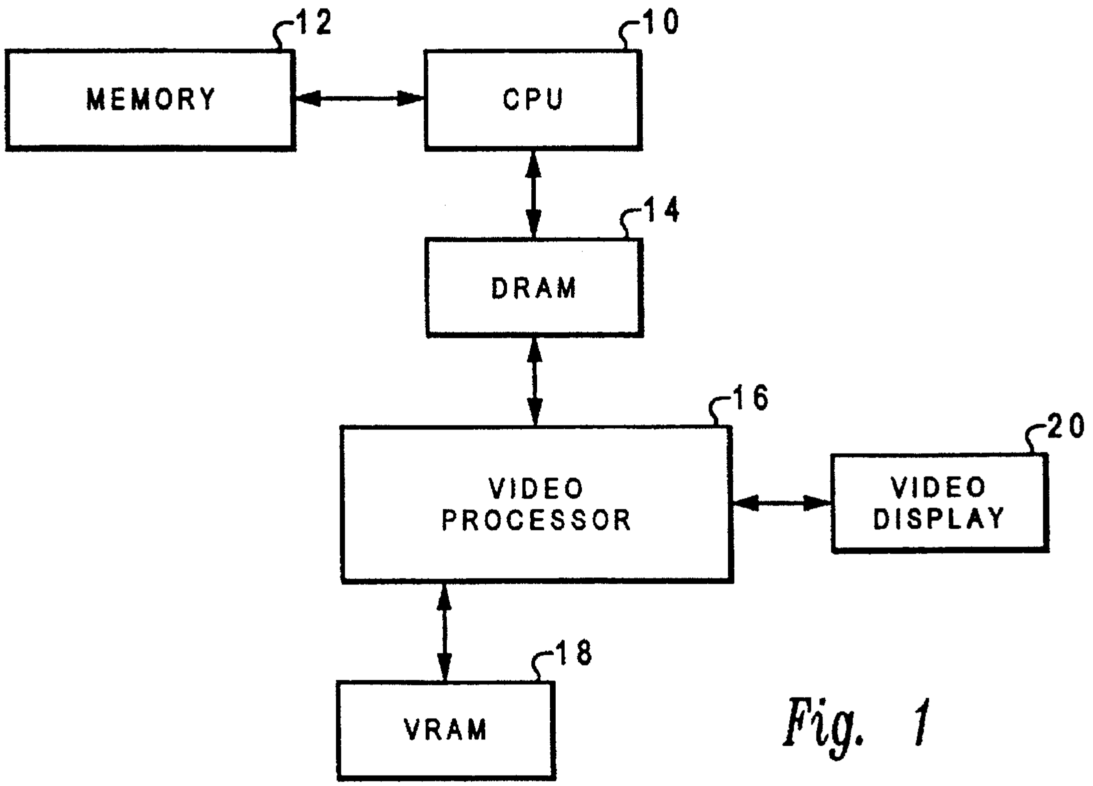
FIG. 1 depicts a block diagram of a video display control system according to the present invention.

In FIG. 1, a video display control system is depicted that comprises a central processing unit (CPU) 10, coupled to a memory 12. CPU 10 further couples to a dynamic random access memory (DRAM) 14, which is further coupled to a video processor 16. Video processor 16 is coupled to video RAM (VRAM) 18 and to a video display device 20.

Figure 2:
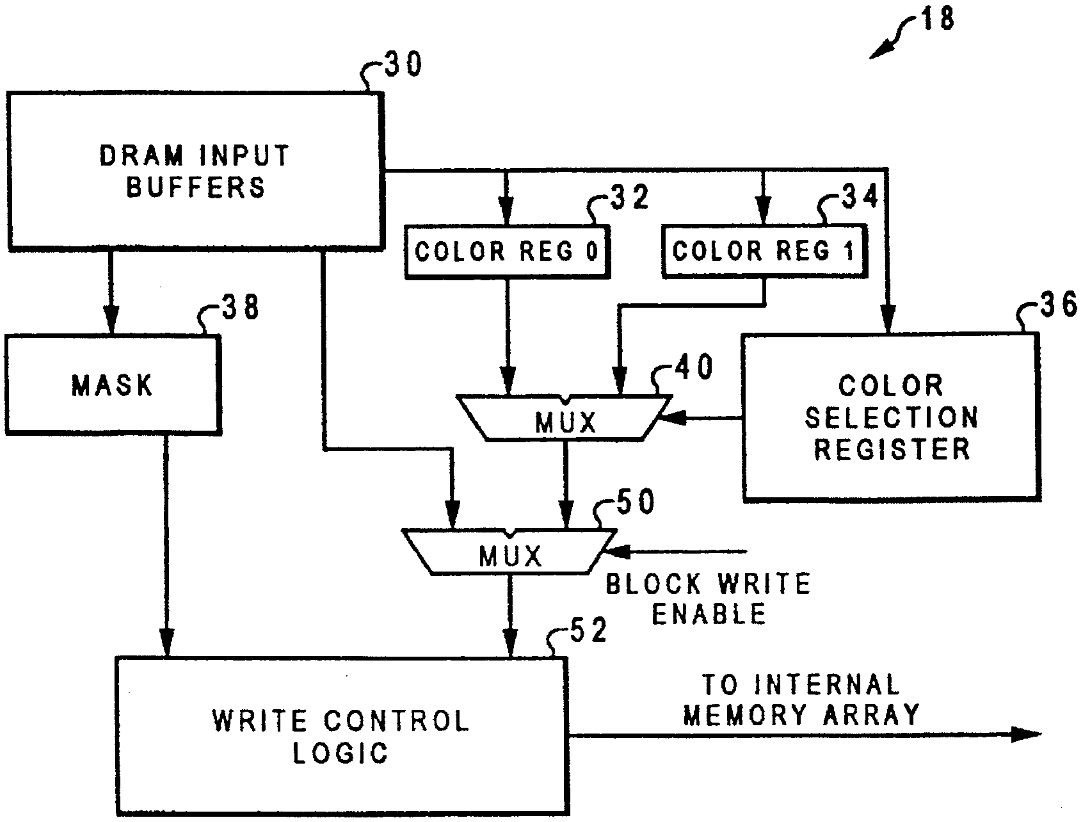
FIG. 2 displays a block diagram of a VRAM device as displayed in FIG. 1.

Memory 12 comprises a read only memory (ROM) for storing programs to be executed by CPU 10 and a RAM for storing data to be processed by CPU 10. A screen on video display 20 provides a plurality of display elements that constitute a display image. VRAM 18 stores in a dot map fashion a plurality of color codes, each comprised of eight (8) bits and corresponding to a respective one of the display elements on the screen. Upon receipt of a display command from CPU 10, video processor 16 reads the color codes from VRAM 18 and converts them into appropriate analog color signals. The analog color signals are then supplied to video display 20 for providing a color video image. Video processor 16, through VRAM 18, provides opaque text and patterns for display on video display 20. The band at which the opaque text and pattern is transmitted to video display 20 is at about 800M pixels/sec, which allows for reduced coprocessor complexity. VRAM 18 is more fully depicted in the block diagram of FIG. 2.

VRAM 18 includes a set of DRAM input buffers 30, which receives video display code information from DRAM 14 through video processor 16. DRAM input buffers 30 are further connected to a first color register 0 32, a second color register 1 34, a color selection register 36, and a mask register 38. Color register 0 32 holds the color code for a first color value and color register 1 34 holds a color code for a second color value. Color values are further multiplexed through multiplexor 40, which is controlled by color selection register 36. Color selection register 36 stores the value for which color value in either color register 0 32 or color register 1 34 is to be processed in a particular pattern. A second multiplexor 50 transfers information from DRAM input buffers 30 and from the first multiplexor 40 to the write per bit controller or write control logic 52. Multiplexor 50 is activated by a block write enable signal, which comes from a control pin on the VRAM. Mask 38 is used to select which pixels are to change during the opaque pattern write operation. Finally, the video color display information passed through write control logic 52 is sent back to video processor 16 to an internal memory array therein for subsequent display on video display 20.

An example of a VRAM implementing a transparent pattern block write is shown below:

| Color Register 1 | Mask Register |
|---|---|
| 11001101 = xCD | 11110000 |

Masked Block Write Results

| Pixel 1 | Pixel 2 | Pixel 3 | Pixel 4 | Pixel 5 | Pixel 6 | Pixel 7 | Pixel 8 |
|---|---|---|---|---|---|---|---|
| xCD | xCD | xCD | xCD | Unchanged | Unchanged | Unchanged | Unchanged |

The transparent pattern block write operation requires only one color register and one mask register. The resulting mask block write result shows that only one color value can be changed during a block write.

By contrast, an example of a block write result is shown below:

| Color Select Register | Color Register 0 | Color Register 1 |
|---|---|---|
| 0101xxxx | 11001101 = xCD | 00010101 = x15 |

Note - 2 color registers used
Color register 0 is used when color select register bit = 0
Color register 1 is used when color select bit register bit = 1

Masked Block Write Results using new function for opaque pattern writes.

| Pixel 1 | Pixel 2 | Pixel 3 | Pixel 4 | Pixel 5 | Pixel 6 | Pixel 7 | Pixel 8 |
|---|---|---|---|---|---|---|---|
| xCD | x15 | xCD | x15 | Unchanged | Unchanged | Unchanged | Unchanged |

In VRAM 18, which has four 8-bit registers, two for color values, one for select value, and one for masking, an opaque pattern write is possible. Specifically, since two color values can be written during the same write operation, as shown in the masked block write result above.

In operation, VRAM 18 uses a write per bit controller or write control logic 52, which uses a mask register 38. They system uses a 3:1 multiplexor, rather than the 2:1 multiplexor used in prior VRAM systems, to gate the correct color to the write control logic 52, depending upon the color selection register 36. Further, color register 0 32 and color register 1 34 are loaded with desired foreground and background desired colors, respectively. Next, the pixel pattern is loaded into color selection register 36. Mask register 38 operates to determine which pixels in the block write function are to change.

While the invention has been particularly shown and described with reference to a preferred embodiment, it will be understood by those skilled in the art that various changes in form and detail may be made therein without departing from the spirit and scope of the invention.

I claim:

1. A video random access memory (VRAM) comprising:

an input buffer for receiving and holding video input information;

a first color register, coupled to said input buffer, for holding a first color value from said input buffer;

a second color register, coupled to said input buffer, for holding a second color value from said input buffer;

a gate multiplexor, coupled to said first color register and said second color register;

a color selection register, coupled to said input buffer and to said gate multiplexor, that uses a color selection information signal from said input buffer for gating which color value from said first color register or said second color register should be asserted;

a write control logic, coupled to said gate multiplexor, for writing said selected color value and;

a mask register containing a plurality of bits, coupled to said input buffer and to said write control logic, that, based upon data from said input buffer which determine a state of each of said plurality of bits, selects which pixel location from among a plurality of pixel locations corresponding to each of said plurality of bits shall be changed based on the color value selected by said color selection register as output by said write control logic.

2. The VRAM according to claim 1 wherein said register are 8-bit registers.

3. The VRAM according to claim 1 further comprising a second multiplexor coupled to said gate multiplexor, said input buffer, and to said write control logic for gating data either from said first and second color registers or from said input buffers to said write control logic, upon the assertion of a block write enable signal.

4. The VRAM according to claim 1 wherein said first color register provides foreground color data for display.

5. The VRAM according to claim 1 wherein said second color register provides background color data for display.

6. A video display system comprising:

a central processing unit for processing video information;

a random access memory, coupled to said CPU, that stores video data information from said CPU;

a video processor, coupled to said random access memory, that process said video display information directed from said CPU;

a video display unit, coupled to said video processor, for displaying said video display information processed by video processor;

a video random access memory (VRAM), coupled to said video processor, capable of performing opaque pattern block writes to said video display unit, said VRAM further comprising:

an input buffer for receiving and holding video input information;

a first color register, coupled to said input buffer, for holding a first color value from said input buffer;

a second color register, coupled to said input buffer, for holding a second color value from said input buffer;

a first multiplexor, coupled to said first color register and said second color register;

a color selection register, coupled to said input buffer and to said first multiplexor, that uses a color selection information signal from said input buffer for gating which color value from said first color register or said second color register should be asserted;

a write control logic, coupled to said first multiplexor, for writing said selected color value and;

a mask register containing a plurality of bits, coupled to said input buffer and to said write control logic, that, based upon data from said input buffer which determine a state of each of said plurality of bits, selects which pixel location from among a plurality of pixel locations corresponding to each of said plurality of bits shall be changed based on the color value selected by said color selection register as output by said write control logic.

7. The system according to claim 6 wherein said registers are 8-bit registers. although wider registers, up to 32 bits, could be used.

8. The system according to claim 6 wherein said registers are 32-bit registers.

9. The system according to claim 6 further comprising a second multiplexor coupled to said first multiplexor, said input buffer, and to said write control logic for gating data either from said first and second color registers or from said input buffers to said write control logic, upon the assertion of a block write enable signal.

10. The system according to claim 6 wherein said first color register provides foreground color data for display.

11. The system according to claim 6 wherein said second color register provides background color data for display.

12. The system according to claim 6 further comprising a memory unit, coupled to said CPU, for storing programs to be executed by said CPU and for storing data to be processed by said CPU.

* * * * *